United States Patent
Cui et al.

(10) Patent No.: US 10,491,556 B1
(45) Date of Patent: Nov. 26, 2019

(54) METHOD AND DEVICE FOR RETRANSMITTING SHORT MESSAGE, AND STORAGE MEDIUM

(71) Applicant: Beijing Xiaomi Mobile Software Co., Ltd., Beijing (CN)

(72) Inventors: Hengbin Cui, Beijing (CN); Wentao Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/225,190

(22) Filed: Dec. 19, 2018

(30) Foreign Application Priority Data

Jul. 19, 2018 (CN) .......................... 2018 1 0799432

(51) Int. Cl.
| | | |
|---|---|---|
| *H04L 12/58* | (2006.01) | |
| *H04L 1/18* | (2006.01) | |
| *H04W 88/18* | (2009.01) | |
| *H04W 4/14* | (2009.01) | |

(52) U.S. Cl.
CPC ............... *H04L 51/30* (2013.01); *H04L 1/18* (2013.01); *H04L 51/34* (2013.01); *H04L 51/38* (2013.01); *H04W 88/184* (2013.01); *H04W 4/14* (2013.01)

(58) Field of Classification Search
CPC ..... H04W 88/19; H04W 88/02; H04W 88/06; H04W 88/16; H04W 88/10; H04L 1/00; H04L 1/1835; H04L 1/1848; H04L 1/1874; H04L 1/188
See application file for complete search history.

(56) References Cited

U.S. PATENT DOCUMENTS

2014/0068348 A1\* 3/2014 Mondal ................ H04L 41/16
714/45

FOREIGN PATENT DOCUMENTS

| CN | 101068381 A | 11/2007 |
| CN | 101621770 A | 1/2010 |

OTHER PUBLICATIONS

International Search Report issued by the State Intellectual Property Office (SIPO) of the People's Republic of China dated Mar. 27, 2019, in counterpart International Application No. PCT/CN2018/105922.

\* cited by examiner

*Primary Examiner* — Diane D Mizrahi
(74) *Attorney, Agent, or Firm* — Finnegan, Henderson, Farabow, Garrett & Dunner LLP (57) ABSTRACT

The present disclosure provides a method and a device for retransmitting a short message, and a storage medium. The method includes: after transmitting a short message, determining whether the short message can be successfully retransmitted based on a cause value of an error message in response to receiving the error message transmitted back from a network side; and determining whether to retransmit the short message based on a result of determining whether the short message can be successfully retransmitted.

20 Claims, 5 Drawing Sheets

METHOD AND DEVICE FOR RETRANSMITTING SHORT MESSAGE, AND STORAGE MEDIUM

CROSS-REFERENCE TO RELATED APPLICATIONS

This application is based on and claims priority to Chinese Patent Application No. 201810799432.1, filed on Jul. 19, 2018, the entire contents of which are incorporated herein by reference.

TECHNICAL FIELD

The present disclosure generally relates to the field of communication, and more particularly, to a method and a device for retransmitting a short message, and a storage medium.

BACKGROUND

Various types of data service implemented on mobile terminals using a mobile communication network have become increasingly inseparable from people's daily lives, and short message service (SMS) has become a common contact manner for most mobile communication users. In transmission of short messages, the short messages may be transmitted based on a Short Message Relay Protocol (SM-RP) or a Short Message Control Protocol (SM-CP). At present, most smart phones will retransmit a short message when an error message, such as CP ERROR or EP ERROR provided in the protocol, is received, and partial retransmission operations will end in failure, resulting in waste of resources.

SUMMARY

Embodiments of the present disclosure provide a method and a device for retransmitting a short message, and a storage medium.

According to a first aspect of embodiments of the present disclosure, there is provided a method for retransmitting a short message. The method includes: after transmitting a short message, determining whether the short message can be successfully retransmitted based on a cause value of an error message in response to receiving the error message transmitted back from a network side; and determining whether to retransmit the short message based on a result of determining whether the short message can be successfully retransmitted.

According to a second aspect of embodiments of the present disclosure, there is provided a device. The device includes a processor and a memory configured to store instructions executable by the processor. The processor is configured to: after transmitting a short message, determine whether the short message can be successfully retransmitted based on a cause value of an error message in response to receiving the error message transmitted back from a network side; and determine whether to retransmit the short message based on a result of determining whether the short message can be successfully retransmitted.

According to a third aspect of embodiments of the present disclosure, there is provided a computer readable storage medium having instructions stored therein that, when executed by a processor of a device, cause the device to perform the method for retransmitting a short message according to embodiments of the present disclosure.

It is to be understood that, both the foregoing general description and the following detailed description are exemplary and explanatory only and are not restrictive of the present disclosure.

BRIEF DESCRIPTION OF THE DRAWINGS

The accompanying drawings herein are incorporated in and become parts of the specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Short messages may also be called newsletters, information, messages, or text messages. In transmission of short messages, the short messages may be transmitted based on a Short Message Relay Protocol (SM-RP) or a Short Message Control Protocol (SM-CP). At present, most smart phones will retransmit the message when an error message (such as CP ERROR, EP ERROR) is received, and partial retransmission operations will end in failure, resulting in waste of resources.

In view of this, embodiments of the present disclosure provide a method for retransmitting a short message. After the short message is transmitted, when an error message transmitted back from a network side is received, it may be determined whether the short message can be successfully retransmitted based on a cause value of the error message, and then it may be determined whether to retransmit the short message based on a result of determining whether the short message can be successfully retransmitted, thus waste of resources caused by retransmission of all failures may be avoided.

Embodiments of the present disclosure will be described below with reference to the accompanying drawings.

Figure 1:
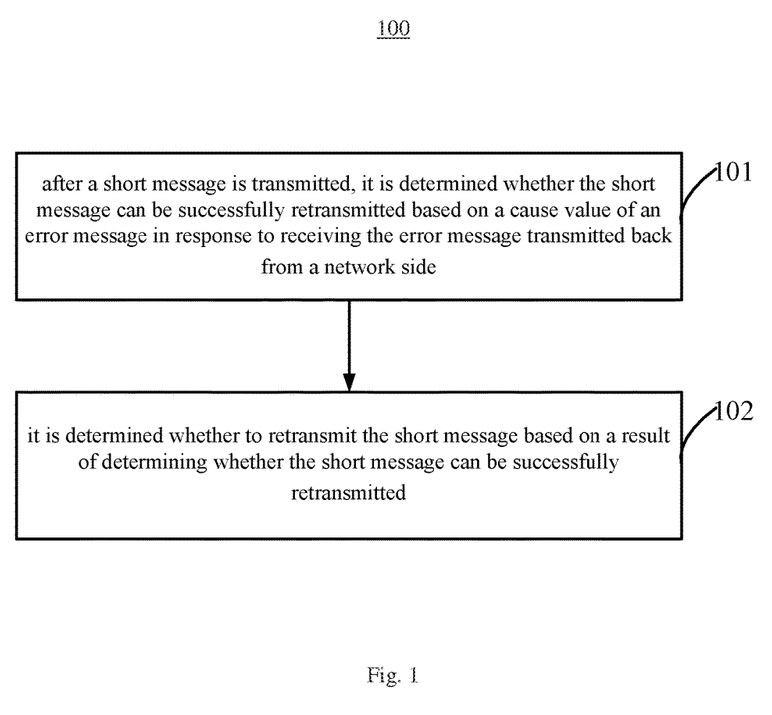
FIG. 1 is a flow chart of a method for retransmitting a short message according to an exemplary embodiment.

FIG. 1 is a flow chart of a method 100 for retransmitting a short message according to an exemplary embodiment. The method 100 may be applicable to a mobile terminal, and may include the following operations.

At block 101, after a short message is transmitted, it is determined whether the short message can be successfully retransmitted based on a cause value of an error message in response to receiving the error message transmitted back from a network side.

At block 102, it is determined whether to retransmit the short message based on a result of determining whether the short message can be successfully retransmitted.

In an embodiment of the present disclosure, the mobile terminal may include a handheld device, a wearable device or other electronic devices, such as a communication module applied to a smart terminal, having wireless communication capabilities. In the mobile terminal, the edited short message may be exchanged with the network side through a protocol. In an embodiment, the network side may include a short message relay (SMR) entity and a short message control (SMC) entity.

There may be different cases after the short message is transmitted, some cases may be solved by a retransmission mechanism in the protocol, and embodiments of present disclosure optimize the cases with error prompting. When an error message, referred to herein as ERROR, is received from the network side, it may be determined whether the short message can be successfully retransmitted based on the cause value of the error message, and then it may be determined whether to retransmit the short message.

In transmission of short messages, the short messages may be transmitted based on the SM-RP or the SM-CP, and correspondingly, error messages CP_ERROR or RP_ERROR may be received. Accordingly, the error messages may include CP_ERROR and RP_ERROR. It can be understood that, the error messages received may vary depending on the protocols, and in embodiments of the present disclosure, the error messages may also include error messages corresponding to other protocols, which are not limited here.

In exemplary embodiments, different cause values in the error message may represent different causes. As an example, partial cause values of CP_ERROR are shown in Table 1 below.

TABLE 1

| Cause value | Cause nr. | Cause |
|---|---|---|
| 0 0 1 0 0 0 1 | 17 | Network failure |
| 0 0 1 0 1 1 0 | 22 | Congestion |
| 1 0 1 0 0 0 1 | 81 | Invalid transaction identifier value |
| 1 0 1 1 1 1 1 | 95 | Semantically incorrect message |
| 1 1 0 0 0 0 0 | 96 | Invalid mandatory information |
| 1 1 0 0 0 0 1 | 97 | Message type non-existent or not implemented |
| 1 1 0 0 0 1 0 | 98 | Message not compatible with the short message protocol state |
| 1 1 0 0 0 1 1 | 99 | Information element non-existent or not implemented |
| 1 1 0 1 1 1 1 | 111 | Protocol error, unspecified |

All other cause values shall be treated as cause number 111.

Since different cause values may indicate different causes, and the causes may be configured to determine whether the short message may be successfully retransmitted, it may be determined whether the short message can be successfully retransmitted based on the cause value, and then it may be determined whether to retransmit the short message based on the result of determining whether the short message can be successfully retransmitted, thus the cases with error prompting may be optimized, and waste of resources caused by retransmission of all failures may be avoided.

Since different cause values may indicate different causes, there may be many ways to determine whether the short message can be successfully retransmitted based on the cause value. For example, the cause values in the error message may be classified in advance, into cause values indicating that the short message can be successfully retransmitted and cause values indicating that the short message cannot be retransmitted successfully.

Figure 2:
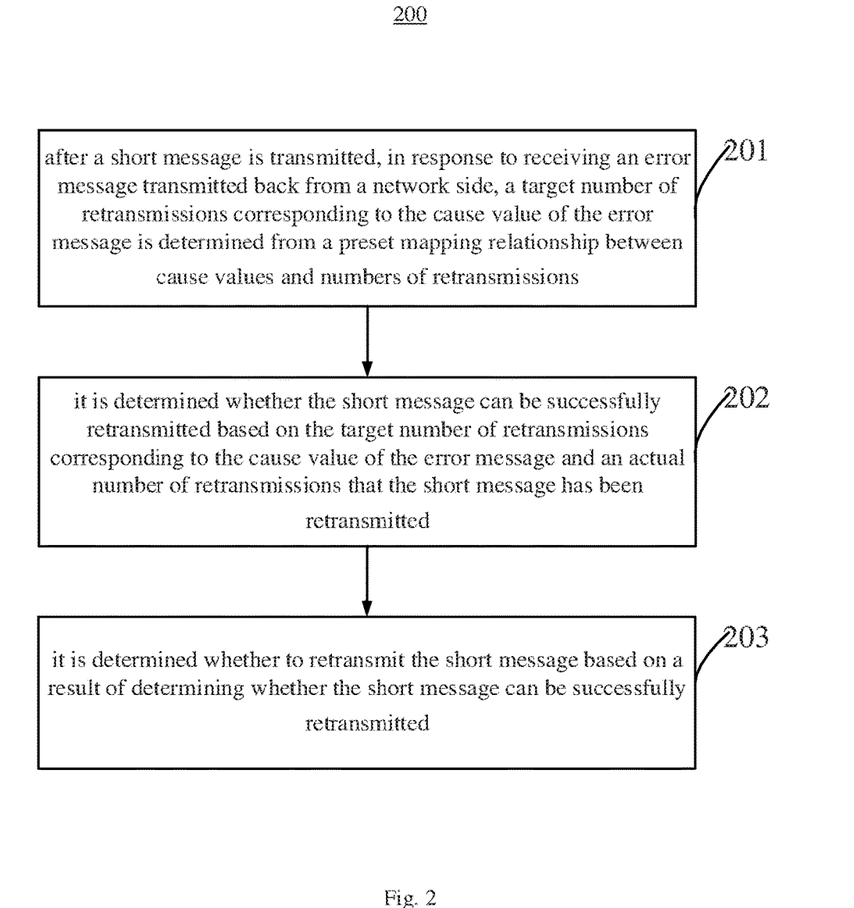
FIG. 2 is a flow chart of a method for retransmitting a short message according to another exemplary embodiment.

FIG. 2 is a flow chart of a method 200 for retransmitting a short message according to another exemplary embodiment. On the basis of foregoing embodiments, whether the short message can be retransmitted successfully based on the cause value is described, and the method 200 may include the following operations.

At block 201, after a short message is transmitted, in response to receiving an error message transmitted back from a network side, a target number of retransmissions corresponding to the cause value of the error message is determined from a preset mapping relationship between cause values and numbers of retransmissions.

In the preset mapping relationship, each number of retransmissions is determined based on whether the short message can be successfully retransmitted, and the number of retransmissions is at least 0, meaning no retransmission.

At block 202, it is determined whether the short message can be successfully retransmitted based on the target number of retransmissions corresponding to the cause value of the error message and an actual number of retransmissions that the short message has been retransmitted.

At block 203, it is determined whether to retransmit the short message based on a result of determining whether the short message can be successfully retransmitted.

The number of retransmissions is at least 0, such that retransmission of short messages is not performed under all cause values.

The preset mapping relationship may indicate the correspondence between cause values and number of retransmissions. In an example, the mapping relationship between different number of retransmissions and different cause values may be recorded in a same table. In another example, the preset mapping relationship may be represented by different preset classification tables, and the different preset classification tables may be classified based on the number of retransmissions. In the embodiment, the different cause values may be classified into different classification tables based on the number of retransmissions, and the number of retransmissions in the same classification table is the same, thus the numbers of retransmissions of different cause values may be distinguished by the classification tables. For example, the preset classification tables may include a classification table for 0 retransmission (i.e., no retransmission), a classification table for 1 retransmission, and a classification table for 2 retransmissions. The classification table for 0 retransmission may include cause values that have been determined to cause retransmission failure. The classification table for 1 retransmission may include cause values of unclear or undetermined causes. The classification table for 2 retransmissions may include cause values other than the cause values in the classification table for 0 retransmission and in the classification table for 1 retransmission.

For example, for the cause values of CP_ERROR shown in Table 1 above, the classification table for 0 retransmission may include 81, 95, 96, 97, 98, and 99. The classification table for 1 retransmission may include 111 and all other cause values that shall be treated as cause value 111. The classification table for 2 retransmissions may include cause values other than the cause values in the classification table for 0 retransmission and in the classification table for 1 retransmission.

For another example, partial cause values of RP_ERROR are shown in Table 2 below.

TABLE 2

| Cause value Class value 7 6 5 4 3 2 1 | Cause number # | Cause |
|---|---|---|
| 0 0 0 0 0 0 1 | 1 | Unassigned (unallocated) number |
| 0 0 0 1 0 0 0 | 8 | Operator determined barring |
| 0 0 0 1 0 1 0 | 10 | Call barred |
| 0 0 0 1 0 1 1 | 11 | Reserved |
| 0 0 1 0 1 0 1 | 21 | Short message transfer rejected |
| 0 0 1 1 0 1 1 | 27 | Destination out of order |
| 0 0 1 1 1 0 0 | 28 | Unidentified subscriber |
| 0 0 1 1 1 0 1 | 29 | Facility rejected |
| 0 0 1 1 1 1 0 | 30 | Unknown subscriber |
| 0 1 0 0 1 1 0 | 38 | Network out of order |
| 0 1 0 1 0 0 1 | 41 | Temporary failure |
| 0 1 0 1 0 1 0 | 42 | Congestion |
| 0 1 0 1 1 1 1 | 47 | Resources unavailable, unspecified |
| 0 1 1 0 0 1 0 | 50 | Requested facility not subscribed |
| 1 0 0 0 1 0 1 | 69 | Requested facility not implemented |
| 1 0 1 0 0 0 1 | 81 | Invalid short message transfer reference value |
| 1 0 1 1 1 1 1 | 95 | Semantically incorrect message |
| 1 1 0 0 0 0 0 | 96 | Invalid mandatory information |
| 1 1 0 0 0 0 1 | 97 | Message type non-existent or not implemented |
| 1 1 0 0 0 1 0 | 98 | Message not compatible with short message protocol state. |
| 1 1 0 0 0 1 1 | 99 | Information element non-existent or not implemented |
| 1 1 0 1 1 1 1 | 111 | Protocol error, unspecified |
| 1 1 1 1 1 1 1 | 127 | Interworking, unspecified |

All other cause values shall be treated as cause number 41, "Temporary Failure".

In this example, the classification table for 0 retransmission may include 1, 8, 10, 29, 30, 50, 69, 81, 95, 96, 97, 98, and 99, the classification table for 1 retransmission may include 111 and 127, and the classification table for 2 retransmissions may include cause values other than the cause values in the classification table for 0 retransmission and in the classification table for 1 retransmission.

It can be understood that, the above is only exemplary using the error values in CP_ERROR and RP_ERROR, and other error values may also be used. In addition, the classification tables may not be limited to the classification table for 0 retransmission, the classification table for 1 retransmission, and the classification table for 2 retransmissions, and may be set based on actual requirements.

Regarding the preset mapping relationship between the cause values and the numbers of retransmissions, in an example, the mapping relationship between the cause values and the numbers of retransmissions may be created based on instructions received from a user. For example, the user may treat a cause value that obviously cannot be retransmitted as a failure (0 retransmission), and for cause values of unclear or undetermined causes, retransmission failure probability statistics may be calculated, after the retransmission failure probability of a cause value is greater than a certain degree, the user may treat the cause value as a failure, and for remaining cause values that have chances of retransmitting successfully, the user may set the number of retransmissions of the cause values to be greater than 0.

In another embodiment, the preset mapping relationship between the cause values and the numbers of retransmissions may be determined based on a probability of successful retransmission under causes indicated by cause values in a historical record. In the embodiment, by counting the probability of successful retransmission under causes indicated by different cause values in the historical record, the preset mapping relationship between the cause values and the numbers of retransmissions may be determined based on the probability.

For example, the classification tables include the classification table for 0 retransmission, the classification table for 1 retransmission, and the classification table for 2 retransmissions. When the probability of successful retransmission of a short message under a cause value is less than a first preset threshold, the cause value may be classified into the classification table for 0 retransmission. When the probability of successful retransmission of a short message under a cause value is between the first preset threshold and a second preset threshold, the cause value may be classified into the classification table for 1 retransmission. When the probability of successful retransmission of a short message under a cause value is greater than the second preset threshold, the cause value may be classified into the classification table for 2 retransmissions. The first preset threshold is less than the second threshold.

After the target number of retransmissions corresponding to the cause value of the error message received is determined based on the preset mapping relationship, it may be determined whether the short message can be successfully retransmitted based on the target number of retransmissions corresponding to the cause value of the error message and the actual number of retransmissions that the short message has been retransmitted.

The actual number of retransmissions that the short message has been retransmitted may refer to the times that the short message has been retransmitted under the cause value, such that a retransmission operation for the target number of retransmissions on the short message under the cause value of the error message may be implemented. When the target number of retransmissions is 0, it is determined that the short message cannot be successfully retransmitted. When the target number of retransmissions is not equal to 0, and the actual number of retransmissions that the short message has been retransmitted does not reach the target number, it is determined that the short message may be successfully retransmitted. When the target number of retransmissions is not equal to 0, and the actual number of retransmissions that the short message has been retransmitted reaches the target number, it is determined that the short message cannot be retransmitted successfully.

It may be seen that, in the embodiment, by determining the target number of retransmissions corresponding to the cause value and the actual number of retransmissions that the short message has been retransmitted, it may be determined whether the short message can be successfully retransmitted, thus determination efficiency may be improved.

Corresponding to the foregoing embodiments of the method for retransmitting a short message, the present disclosure also provides embodiments of a device for retransmitting a short message, and a storage medium.

Figure 3:
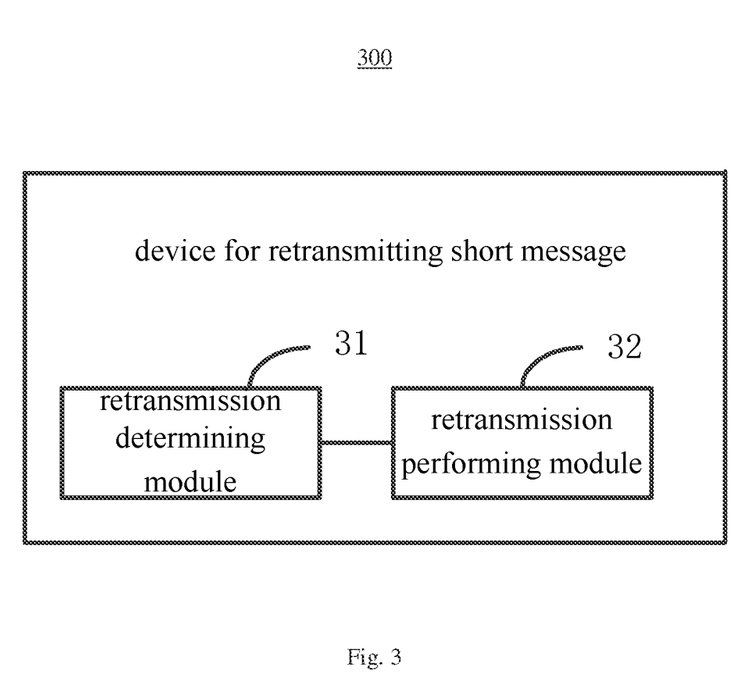
FIG. 3 is a block diagram of a device for retransmitting a short message according to an exemplary embodiment.

FIG. 3 is a block diagram of a device 300 for retransmitting a short message according to an exemplary embodiment. As illustrated in FIG. 3, the device 300 includes a retransmission determining module 31 and a retransmission performing module 32.

The retransmission determining module 31 is configured to, after transmitting a short message, determine whether the short message can be successfully retransmitted based on a cause value of an error message in response to receiving the error message transmitted back from a network side.

The retransmission performing module 32 is configured to determine whether to retransmit the short message based on a result of determining whether the short message can be successfully retransmitted.

As can be seen from the above embodiments, after the short message is transmitted, when an error message transmitted back from the network side is received, it may be determined whether the short message can be successfully retransmitted based on the cause value of the error message, and then it may be determined whether to retransmit the short message based on the result of determining whether the short message can be successfully retransmitted, thereby avoiding waste of sources caused by retransmission of all failures.

Figure 4:
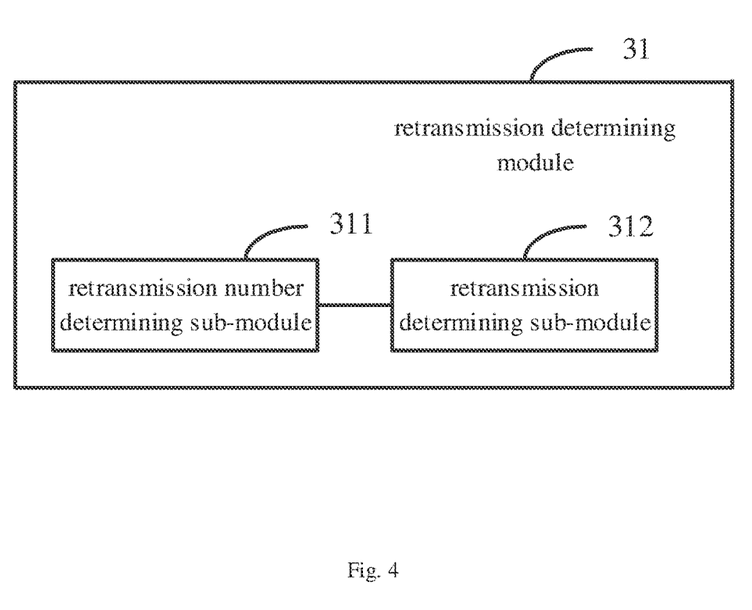
FIG. 4 is a block diagram of a device for retransmitting a short message according to another exemplary embodiment.

FIG. 4 is a block diagram of a device for retransmitting a short message according to another exemplary embodiment. As illustrated in FIG. 4, the device is the retransmission determining module 31 that includes a retransmission number determining sub-module 311 and a retransmission determining sub-module 312.

The retransmission number determining sub-module 311 is configured to, in response to receiving the error message transmitted back from the network side after transmitting the short message, determine a target number of retransmissions corresponding to the cause value of the error message from a preset mapping relationship between cause values and numbers of retransmissions. The number of retransmissions is determined based on whether the short message can be successfully retransmitted, and the number of retransmissions is at least 0.

The retransmission determining sub-module 312 is configured to determine whether the short message can be successfully retransmitted based on the target number of retransmissions corresponding to the cause value of the error message and an actual number of retransmissions that the short message has been retransmitted.

As can be seen from the above embodiments, by determining the target number of retransmissions corresponding to the cause value and the actual number of retransmissions that the short message has been retransmitted, it may be determined whether the short message can be successfully retransmitted, thus determination efficiency may be improved.

In an embodiment, the preset mapping relationship is represented by different preset classification tables, and the different preset classification tables are classified based on the numbers of retransmissions.

As can be seen from the above embodiments, the cause values corresponding to different numbers of retransmissions may be classified into different classification tables, and the cause values corresponding to the same number of retransmissions may be classified into the same classification table, thus the numbers of retransmissions the cause values may be distinguished by the classification tables.

In an embodiment, the error message includes CP_ERROR and RP_ERROR, the preset classification tables include a classification table for 0 retransmission, a classification table for 1 retransmission, and a classification table for 2 retransmissions. The classification table for 0 retransmission includes cause values that have been determined to cause retransmission failure. The classification table for 1 retransmission includes cause values of unclear or undetermined causes. The classification table for 2 retransmissions includes cause values other than the cause values in the classification table for 0 retransmission and in the classification table for 1 retransmission.

In the above embodiment, the numbers of retransmissions of the short message include 0, 1 and 2. Thus, for some short messages, the retransmission operation is not performed, and for other short messages, at most 2 retransmissions are performed, thereby saving resources.

In an embodiment, the preset mapping relationship is determined based on a probability of successful retransmission under causes indicated by cause values in a historical record.

In the embodiment, the correspondence between the cause values and the numbers of retransmissions is determined based on the probability of successful retransmission under the causes indicated by the cause values in the historical record, thus the preset mapping relationship can be automatically constructed.

The present disclosure further provides an electronic device. The electronic device includes a processor and a memory configured to store instructions executable by the processor. The processor is configured to: after transmitting a short message, determine whether the short message can be successfully retransmitted based on a cause value of an error message in response to receiving the error message transmitted back from a network side; and determine whether to retransmit the short message based on a result of determining whether the short message can be successfully retransmitted.

The present disclosure further provides a computer readable storage medium having computer programs stored therein, when the computer programs are executed by a processor, the methods for retransmitting a short message according to embodiments of the present disclosure are implemented.

The present disclosure may take the form of a computer program product implemented on a storage medium including program codes (including but not limited to disk storage, CD-ROM, optical storage, etc.). The storage medium may be permanent or non-persistent, removable or non-removable medium, and information storage may be implemented by any method or technology. The information may be computer readable instructions, data structures, modules of programs, or other data. Examples of the storage medium include, but are not limited to, phase random access memory (PRAM), static random access memory (SRAM), dynamic random access memory (DRAM), other types of random access memory (RAM), read only memory (ROM), electrically erasable programmable read only memory (EEPROM), flash memory or other memory technology, compact disk read only memory (CD-ROM), digital versatile disk (DVD) or other optical storage, magnetic tape cartridges, magnetic tape storage or other magnetic storage devices or any other non-transportable medium configured to store information that may be accessed by a computing device.

For details of the implementation process of functions of various modules in the foregoing device, reference may be made to the implementation process of the corresponding steps in the foregoing methods.

The above-described device embodiments are merely for the purpose of illustration. Those modules described as separated components may be or may not be physically separated, and those modules described as a component may be or may not be a physical unit, i.e., either located at one place or distributed onto a plurality of network units. The object of the present disclosure may be achieved by part or all of modules in accordance with practical requirements. It would be appreciated and executable by those skilled in the art without creative labor.

Figure 5:
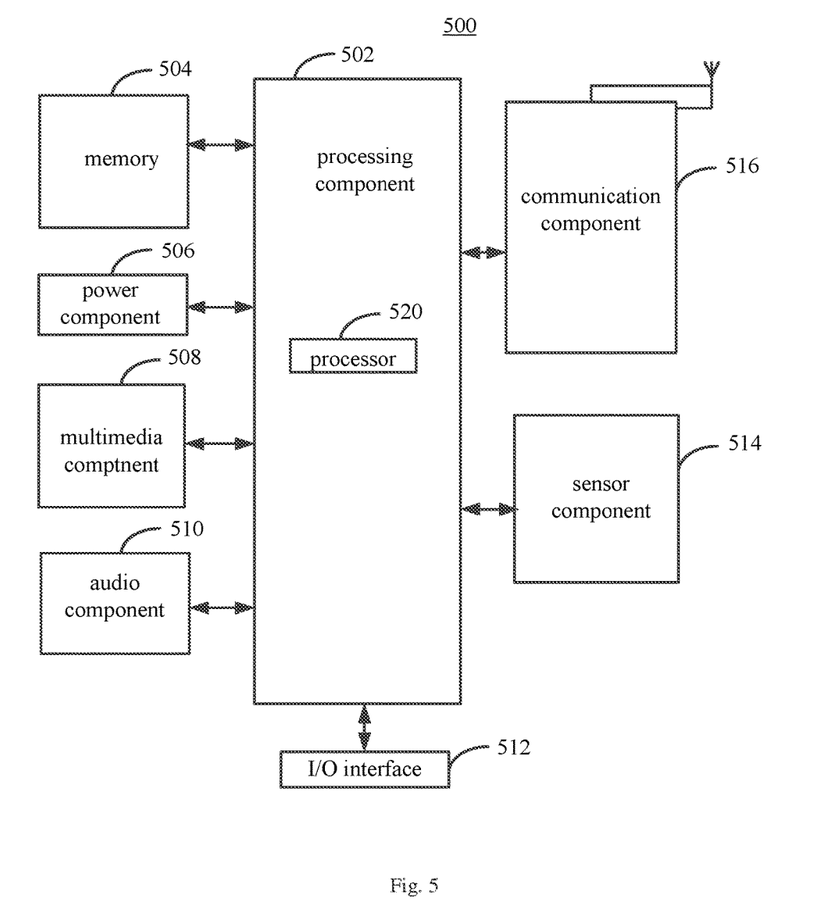
FIG. 5 is a block diagram of a device for retransmitting a short message according to an exemplary embodiment.

FIG. 5 is a block diagram of a device 500 for retransmitting a short message according to an exemplary embodiment. The device 500 may be a mobile phone.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a press panel (TP). If the screen includes the press panel, the screen may be implemented as a press screen to receive input signals from the user. The press panel includes one or more press sensors to sense presses, swipes, and other gestures on the press panel. The press sensors may not only sense a boundary of a press or swipe action, but also sense a duration time and a pressure associated with the press or swipe action. In some embodiments, the multimedia component 508 includes a front camera and/or a rear camera. The front camera and/or the rear camera may receive external multimedia data while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface for the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500 and relative positioning of components (e.g. the display and the keypad of the device 500). The sensor component 514 may also detect a change in position of the device 500 or of a component in the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate wired or wireless communication between the device 500 and other devices. The device 500 may access a wireless network based on a communication standard, such as WIFI, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 504. The above instructions may be executable by the processor 520 in the device 500, for performing the above-described method. For example, the non-transitory computer-readable storage medium may be a ROM, a RAM, a CD-ROM, a magnetic tape, a floppy disc, an optical data storage device, and the like.

When the instructions in the storage medium are performed by the processor, the device 500 may perform a method for retransmitting a short message. The method includes: after transmitting a short message, determining whether the short message can be successfully retransmitted based on a cause value of an error message in response to receiving the error message transmitted back from a network side; and determining whether to retransmit the short message based on a result of determining whether the short message can be successfully retransmitted.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It is to be understood that, the present disclosure is not limited to the exact construction that has been described above and illustrated in the accompanying drawings, and that various modifications and changes may be made without departing form the scope thereof. It is intended that the scope of the present disclosure only be limited by the appended claims.

What is claimed is:

1. A method for retransmitting a short message, comprising:
    after transmitting a short message, determining whether the short message can be successfully retransmitted based on a cause value of an error message in response to receiving the error message transmitted back from a network side; and
    determining whether to retransmit the short message based on a result of determining whether the short message can be successfully retransmitted.

2. The method according to claim 1, wherein determining whether the short message can be successfully retransmitted based on the cause value of the error message comprises:
    determining a target number of retransmissions corresponding to the cause value of the error message from a preset mapping relationship between cause values and numbers of retransmissions, wherein the numbers of retransmissions are determined based on whether the short message can be successfully retransmitted, and are greater than or equal to 0; and
    determining whether the short message can be successfully retransmitted based on the target number of retransmissions corresponding to the cause value of the error message and an actual number of retransmissions that the short message has been retransmitted.

3. The method according to claim 2, wherein the preset mapping relationship is represented by different preset classification tables, and the different preset classification tables are classified based on the numbers of retransmissions.

4. The method according to claim 3, wherein the error message comprises at least one of CP_ERROR or RP_ERROR, and the preset classification tables comprise a classification table for 0 retransmission, a classification table for 1 retransmission, and a classification table for 2 retransmissions,
    the classification table for 0 retransmission comprises cause values that have been determined to cause retransmission failure;
    the classification table for 1 retransmission comprises cause values of undetermined causes; and
    the classification table for 2 retransmissions comprises cause values other than the cause values in the classification table for 0 retransmission and in the classification table for 1 retransmission.

5. The method according to claim 2, wherein the preset mapping relationship is determined based on a probability of successful retransmission under causes indicated by cause values in a historical record.

6. The method according to claim 2, wherein determining whether the short message can be successfully retransmitted based on the target number of retransmissions corresponding to the cause value of the error message and the actual number of retransmissions that the short message has been retransmitted comprises:
    when the target number of retransmissions is 0, determining that the short message cannot be successfully retransmitted;
    when the target number of retransmissions is not equal to 0, and the actual number of retransmissions that the short message has been retransmitted does not reach the target number of retransmissions, determining that the short message can be successfully retransmitted; and
    when the target number of retransmissions is not equal to 0, and the actual number of retransmissions that the short message has been retransmitted reaches the target number of retransmissions, determining that the short message cannot be successfully retransmitted.

7. The method according to claim 3, wherein the preset mapping relationship is determined based on a probability of successful retransmission under causes indicated by cause values in a historical record.

8. A device for retransmitting a short message, comprising:
    a processor; and
    a memory configured to store instructions executable by the processor;
    wherein the processor is configured to:
    after transmitting a short message, determine whether the short message can be successfully retransmitted based on a cause value of an error message in response to receiving the error message transmitted back from a network side; and
    determine whether to retransmit the short message based on a result of determining whether the short message can be successfully retransmitted.

9. The device according to claim 8, wherein the processor is further configured to:
    determine a target number of retransmissions corresponding to the cause value of the error message from a preset mapping relationship between cause values and numbers of retransmissions, wherein the numbers of retransmissions are determined based on whether the short message can be successfully retransmitted, and are greater than or equal to 0; and
    determine whether the short message can be successfully retransmitted based on the target number of retransmissions corresponding to the cause value of the error message and an actual number of retransmissions that the short message has been retransmitted.

10. The device according to claim 9, wherein the preset mapping relationship is represented by different preset classification tables, and the different preset classification tables are classified based on the numbers of retransmissions.

11. The device according to claim 10, wherein the error message comprises at least one of CP_ERROR or RP_ERROR, the preset classification tables comprise a classification table for 0 retransmission, a classification table for 1 retransmission, and a classification table for 2 retransmissions,
    the classification table for 0 retransmission comprises cause values that have been determined to cause retransmission failure;
    the classification table for 1 retransmission comprises cause values of undetermined causes; and
    the classification table for 2 retransmissions comprises cause values other than the cause values in the classification table for 0 retransmission and in the classification table for 1 retransmission.

12. The device according to claim 9, wherein the preset mapping relationship is determined based on a probability of successful retransmission under causes indicated by cause values in a historical record.

13. The device according to claim 9, wherein the processor is further configured to:
when the target number of retransmissions is 0, determine that the short message cannot be successfully retransmitted;
when the target number of retransmissions is not equal to 0, and the actual number of retransmissions that the short message has been retransmitted does not reach the target number of retransmissions, determine that the short message can be successfully retransmitted; and
when the target number of retransmissions is not equal to 0, and the actual number of retransmissions that the short message has been retransmitted reaches the target number of retransmissions, determine that the short message cannot be successfully retransmitted.

14. The device according to claim 10, wherein the preset mapping relationship is determined based on a probability of successful retransmission under causes indicated by cause values in a historical record.

15. A non-transitory computer readable storage medium having instructions stored therein that, when executed by a processor of a device, cause the device to perform a method for retransmitting a short message, the method comprising:
after transmitting a short message, determining whether the short message can be successfully retransmitted based on a cause value of an error message in response to receiving the error message transmitted back from a network side; and
determining whether to retransmit the short message based on a result of determining whether the short message can be successfully retransmitted.

16. The non-transitory computer readable storage medium according to claim 15, wherein determining whether the short message can be successfully retransmitted based on the cause value of the error message comprises:
determining a target number of retransmissions corresponding to the cause value of the error message from a preset mapping relationship between cause values and numbers of retransmissions, wherein the numbers of retransmission are determined based on whether the short message can be successfully retransmitted, and are greater than or equal to 0; and
determining whether the short message can be successfully retransmitted based on the target number of retransmissions corresponding to the cause value of the error message and an actual number of retransmissions that the short message has been retransmitted.

17. The non-transitory computer readable storage medium according to claim 16, wherein the preset mapping relationship is represented by different preset classification tables, and the different preset classification tables are classified based on the numbers of retransmissions.

18. The non-transitory computer readable storage medium according to claim 17, wherein the error message comprises at least one of CP_ERROR or RP_ERROR, and the preset classification tables comprise a classification table for 0 retransmission, a classification table for 1 retransmission, and a classification table for 2 retransmissions,
the classification table for 0 retransmission comprises cause values that have been determined to cause retransmission failure;
the classification table for 1 retransmission comprises cause values of undetermined causes; and
the classification table for 2 retransmissions comprises cause values other than the cause values in the classification table for 0 retransmission and in the classification table for 1 retransmission.

19. The non-transitory computer readable storage medium according to claim 16, wherein the preset mapping relationship is determined based on a probability of successful retransmission under causes indicated by cause values in a historical record.

20. The non-transitory computer readable storage medium according to claim 16, wherein determining whether the short message can be successfully retransmitted based on the target number of retransmissions corresponding to the cause value of the error message and the actual number of retransmissions that the short message has been retransmitted comprises:
when the target number of retransmissions is 0, determining that the short message cannot be successfully retransmitted;
when the target number of retransmissions is not equal to 0, and the actual number of retransmissions that the short message has been retransmitted does not reach the target number of retransmissions, determining that the short message can be successfully retransmitted; and
when the target number of retransmissions is not equal to 0, and the actual number of retransmissions that the short message has been retransmitted reaches the target number of retransmissions, determining that the short message cannot be successfully retransmitted.

* * * * *